Sept. 13, 1955 V. J. DUKE 2,717,931

CIRCUIT FOR VARYING AMPLIFIER GAIN AND FREQUENCY RESPONSE WITH SIGNAL AMPLITUDE

Filed July 29, 1950

INVENTOR
Vernon J. Duke
BY
ATTORNEY

United States Patent Office 2,717,931
Patented Sept. 13, 1955

2,717,931

CIRCUIT FOR VARYING AMPLIFIER GAIN AND FREQUENCY RESPONSE WITH SIGNAL AMPLITUDE

Vernon J. Duke, Long Island, N. Y., assignor to Radio Corporation of America, a corporation of Delaware Application July 29, 1950, Serial No. 176,744

4 Claims. (Cl. 179—171)

The present invention relates to improvements in signal processing circuits and methods, and more particularly, although not necessarily exclusively, to electrical circuits for correcting the wave form characteristics of communications signals.

More directly the present invention relates to signal correction amplifiers for use in television systems to correct the over all brightness-transfer characteristic of the television channel in which the correction circuit is placed. Such correction amplifiers have in the prior art been sometimes referred to as gamma correction amplifiers.

In the communications art it often becomes necessary to alter or reshape existing electrical signals into forms more suitable for the particular purpose or need at hand. Sometimes electrical signals in passing through electronic amplifiers actually suffer distortion which must later be corrected before the signal becomes useful.

By way of example, consideration may be given to video signals found in the television art. It is well-known that one extremity of video signal excursion corresponds to black or dark picture information while the other and opposite extremity corresponds to white or light picture information. The video signal representative of a uniform grey scale or light wedge used in photographic work will generally take the form of a signal having linear increments of amplitude between two potential levels. Arbitrarily such a video signal may represent white picture information by low amplitude levels while depicting black picture information by high amplitude levels relative to some fixed datum.

It can then be seen that should this signal suffer electrical compression at either of its extremities due to amplifier characteristics, the linearity of the signal will be destroyed and the resulting picture information defined by the signal will no longer be a faithful reproduction of the original scene, or in this case, the grey scale.

The need for amplitude correction amplifiers in the television art is quite fully discussed in an article entitled "Gamma and range in television" by I. G. Maloff appearing in the RCA Review for April 1939.

There is in the prior art, however, considerable evidence of an utter disregard of the effect that brightness-transfer or gamma correction has on the apparent noise content in a video signal.

Consider, for example, a video signal in which there is substantial noise such as for example caused by "shot effect." Shot noise is inherent in vacuum tube circuits and arises from the fact that the current in the vacuum tubes consists of the movement of discrete particles rather than the flow of a continuous fluid, giving rise to what is known as shot effect. Assume that due to the non-linear nature of the transfer characteristic of the amplifier through which this signal has been processed, the resulting picture may have the contrast range of the darker shades unduly compressed in comparison to the brighter parts of the picture. When this condition results it is desirable to correct the electrical transfer characteristic at some point in the television system in such a way as to stretch out the darker shades or "blacks" in the picture until more natural results are obtained. Circuits which merely stretch the "blacks" of the picture by expanding the amplitude range of that portion of the video signal defining black information do not alone provide sufficient correction for all situations. To expand or additionally amplify that portion of the video signal corresponding to black over that of the white signal variations will not only expand and correct the compressed "blacks" of the picture but unduly expand the shot-effect noise in the darker portions of the picture.

Since shot-effect noise is represented by random signal excursions some of which extend in the white direction, the "blacks" of the picture tend to become grey looking and infested with moving white specks. In one manner of speaking the stretching of "blacks" in a video signal imparts a greater rate of rise to picture elements and hence increases the over-all effective high frequency noise effect on the picture.

It is therefore an object of the present invention to provide a new and improved signal processing apparatus and method which allows the correction of amplitude distortion in the signal without adversely upsetting the apparent balance of signal frequencies comprising the signal.

It is another object of the present invention to provide a new and improved brightness-transfer or gamma correction circuit for use in television systems which is capable of stretching "blacks" without effectively increasing the apparent noise in the black areas of a picture defined by the signal.

In the realization of the above objects and features of advantage the present invention contemplates the use of the signal processing technique. First, the signal is passed through a variable gain amplifier. Secondly, the gain of the amplifier is controlled in accordance with the instantaneous, in contradistinction to the average, amplitude of the signal applied to the amplifier thereby to obtain stretching or compression of predetermined amplitude ranges of the signal. Thirdly, the frequency response of the amplifier is also controlled in accordance with the instantaneous amplitude of the signal applied to the amplifier. The frequency response and gain control of the amplifier are so related that the high frequency response of the amplifier is reduced during high gain operation of the amplifier and returned to normal during low gain operation of the amplifier. From another standpoint the method of the present invention may be regarded as boosting the low frequency components of the video signal only during high gain amplification thereof.

A more complete understanding of the present invention, as well as other objects and features of advantage may be obtained through a reading of the following description especially when taken in connection with the accompanying drawings.

Figure 1:
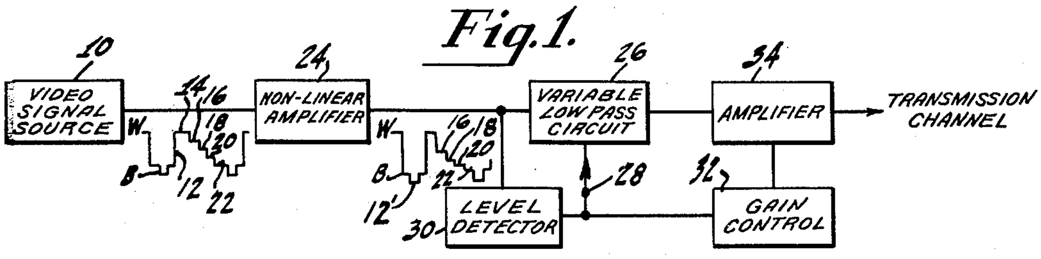
Figure 1 is a block diagram representation of a broad form of the present invention.

Turning now to Figure 1 there is indicated by block 10 a source of video signal. The signal wave form produced by the source 10 is by way of example indicated at 12. The wave form 12 illustrates a typical step wedge or grey scale pattern used in photography and television work and is well-known in the art. Arbitrarily the uppermost extremity of the signal 12 has been indicated as defining white in the television picture while the lowermost extremity is indicated as defining black in the picture. These limits are respectively designated by the letters W and B. From the signal 12 it may be seen that the optical wedge or grey scale being transmitted represents five different densities, 14, 16, 18, 20 and 22 equally spaced between all-white at 14 to all-black at 22.

By way of example, the video signal 12 is shown applied to the input of a non-linear amplifier such as 24. This amplifier may be of any type design to amplify electrical signals. For the purposes of illustrating the present invention it is assumed that the amplifier 24 is inherently non-linear so as to produce amplitude distortion in the form of compression of the "blacks" in the video signal. From the signal 12′ appearing at the output of the non-linear amplifier it may be seen that the steps 16, 18, 20 and 22 have, through the action of the amplifier, been greatly compressed. This would cause the "blacks" of the picture to become muddled and indistinguishable if carried to an extreme.

Correction of this distortion in accordance with the present invention is accomplished as follows. The signal 12′ is applied to the input of a low pass filter circuit 26 or the equivalent which has a variable high frequency cutoff. The cutoff of the low pass circuit is indicated as being controllable by means of a control signal applied to the input terminal 28 of the low pass circuit. A level detector 30 is provided for generating a control signal for the low pass circuit so that for low level (near black) signals the frequency response of the low pass circuit will be reduced so as to accentuate the low signals. For higher amplitude signals such as near white signals the low pass circuit will then be controlled to provide an extended high frequency cutoff thereby allowing more highs to pass through the circuit 26. In accordance with the present invention the output of the level detector 30 is further applied to a gain control circuit 32 which controls the gain of an amplifier such as 34. The control relationship which exists between the level detector 30 and the gain control 32 is such that the gain of the amplifier 34 can be substantially instantaneously changed in accordance with the amplitude of the incoming signal 12′. The operation is arranged so that the gain of the amplifier 34 will increase for low amplitude signals corresponding to near black while decrease or reduce to normal for high amplitude signals near white.

The gain control action on the amplifier 34 is conventional in itself to provide stretching of the "blacks" in the signal 12′ so as to produce the desired output wave form closely resembling that of the original signal 12. However, the simultaneous control of the frequency response characteristic of the channel along with the compression of the signal forms an important part of the present invention and is novel with respect thereto. With the arrangement shown in Figure 1, stretching of the blacks is attended by a suitable decrease in the relative high frequency components in the processed signal. Thus there will be no net increase in the visual effect of high frequency noise which may be in the original signal 12.

Figure 2:
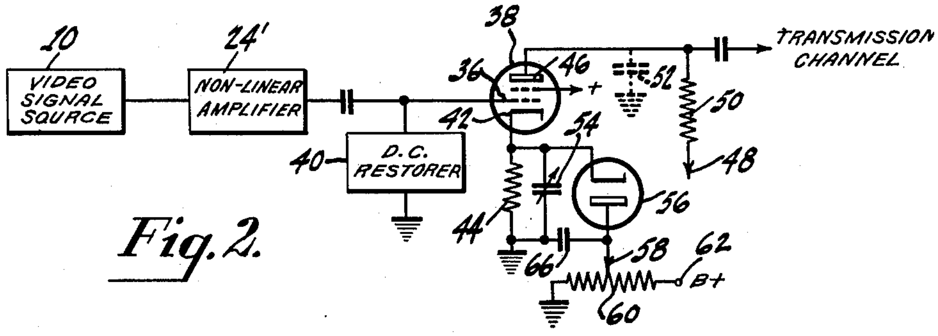
Figure 2 is a combination block diagram and schematic representation of a specific embodiment of the present invention.

The embodiments of the present invention shown and described in Figure 1 are incorporated and illustrated in the specific embodiment shown in Figure 2. Again the video signal emanating from the video signal source 10 is applied to the non-linear amplifier 24′ in which "blacks" are undesirably compressed. The amplifier 24′ may be identical to amplifier 24. Thus "blacks are represented by negative amplitude excursions of the signal and whites are represented by positive amplitude excursions of the signal. In accordance with the present invention the distorted video signal is applied to the grid 36 of electron discharge tube amplifier 38. D. C. restorer 40 clamps the signal applied to the grid so as to maintain the most negative excursion of the video signal at a predetermined point on the transfer characteristic of the tube 38. This technique is well-known in the art and needs no further description here. The cathode 42 of the discharge tube 38 is connected to ground through cathode resistor 34. The anode 46 of the tube 48 is connected with a source of positive potential having a terminal at 48 through a load resistor 50. Stray circuit capacity is indicated at 52.

In accordance with the present invention the cathode resistor 44 is by-passed with a small capacitor such as 54 so as to obtain degenerative high frequency peaking in the amplifier stage. The capacitor 54 has been indicated as being variable in nature but of course may be fixed in practice. The resistance 44 is in accordance with the present invention adapted to be conditionally by-passed or shunted by a diode or other conduction device such as 56. Diode 56 has its cathode connected with the cathode of amplifier 38. The anode of the diode is connected with the tap 58 on potentiometer 60. Potentiometer 60 is connected as a bleeder having a terminal 62.

Figure 4:
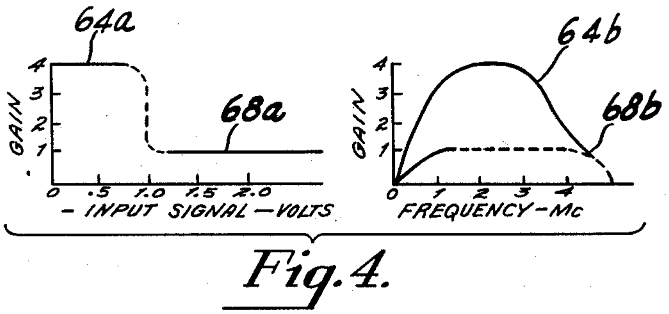
Figure 4 is a graphical presentation of certain electrical characteristics of the present invention in one mode of operation.

The characteristics of the amplifier stage as thus constructed in accordance with the present invention is shown in Figures 4*a* and 4*b*. Considering 4*a* and the operation of the arrangement in Figure 2, it will be seen that the positive voltage placed in series with the diode 56 by means of bleeder 60 tends to bias the diode in a normally conducting direction. This means that the degenerative cathode resistor 34 and associated capacitor 54 will be normally by-passed so that the gain of the amplifier stage 38 will be maximum. This is indicated by curves **64*a* and 64*b*** in Figures 4*a* and 4*b*. It will be seen that the time constant of the load resistor 50 and the total stray circuit capacity is such to allow the gain of the stage to drop off at some upper frequency, such as for example 4 megacycles, to a value approximately ¼ of that displayed for lower frequencies. If now the instantaneous value of voltage on grid 36 becomes sufficiently positive to cause the cathode of the diode 56 to swing positive with respect to its anode, the diode 56 will no longer conduct. Under these conditions the resistor and shunt capacitor 54 will be effectively inserted in series with the cathode circuit. This will, of course, decrease the gain of the amplifier 38. The capacitor 54 is selected in value so as to extend the high frequency response of the amplifier under these latter conditions. The curves **68*a* and 68*b*** in Figures 4*a* and 4*b* respectively, show the operating conditions now obtained as shown. In Figure 4*b* the amount of degeneration permitted in the embodiments of Figure 2 is shown to be such that when the diode 56 becomes non-conducting the gain of the amplifier is reduced to approximately ¼ of that previously obtained.

It may thus be seen from the operation of Figure 2 that the "blacks" of the applied video signal will be amplified greatly by a factor defined by curve **64*b*** in Figure 4*b* while the whites will be amplified by a lesser factor described by a curve 68 in Figure 4*b*. The blacks will therefore be stretched and be properly controlled by the bias placed on the diode 56 as well as the values of resistor 44 and capacitor 54. Hence correction of the distortion produced by the non-linear amplifier 24′ may be obtained. Since the high frequency response of the amplifier 38 is relatively reduced when operating on curve **64*b***, the noise in the blacks will not be exaggerated. It is sometimes desirable with the arrangement in Figure 2 to have the percent frequency response in the blacks drop down at the high frequencies in proportion to the stretching of the particular video components involved. From an overall standpoint it may be seen that an arrangement of the present invention maintains the high frequency response of the system, for example 4 megacycles, at a constant signal level output so that distortion of high frequency detail is not produced.

Figure 3:
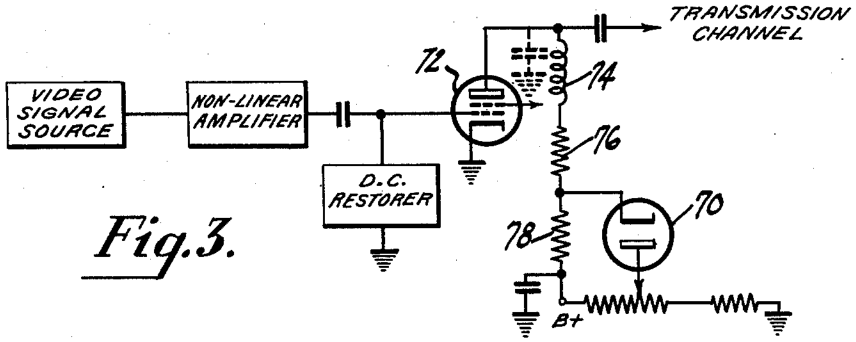
Figure 3 is a combination block diagram and schematic representation of still another form of the present invention.

Figure 3 shows still another form of the present invention. Here the selected diode 70 is incorporated in shunt with the pole of the plate load circuit for the amplifier tube 72. Inductance 74, resistor 76 and resistor 78 all form part of the load circuit of the amplifier tube. The diode 70 is shown in shunt with the resistor 78. The diode 70 is made normally conducting by means of adjusting the potentiometer 80.

The operation of that embodiment of the invention shown in Figure 3 is as follows. Assuming the sync negative video signal tube is applied to the discharge tube 72 it follows that all points along the plate load of discharge tube 72 will tend to swing positively for black picture information. Thus, at some level of black picture information the diode 70 will necessarily become non-conducting and the resistor 78 will be effectively thrown in series with the load circuit of the discharge tube. This, of course, will increase the gain of the amplifier at low frequencies and result in a curve much like that shown at **64*b*** in Figure 4*b*. With the diode 70 open the time constant of the amplifier output circuit is, of course, increased and this will reduce the relative high frequency response of the circuit as previously indicated in accordance with the present invention. Thus, in Figure 3 black picture information will receive higher relative amplification than white picture information and during this higher amplification, the low frequencies of the signal will be accentuated above the high frequency components of the signal.

Although the present invention has hereinabove been described in connection with resistance-coupled amplifiers and selective diode shunting circuits, it is evident that other arrangements may be employed to accomplish the basic process outlined by the invention. In brief, the present invention deals with two components in a video signal, namely, the low frequency components and the high frequency components. Gamma correction is then applied largely to the low frequency components thereby leaving the high frequency components relatively untouched.

Having thus described my invention what I claim is:

1. In a signal transmission channel for electrical signals having high and low amplitude portions as well as high and low frequency components, an electron discharge tube amplifier having at least an anode, cathode and control electrode, a potential datum, an input circuit for applying video signal to said discharge tube control electrode, an output circuit for said discharge tube consisting solely of a resistance connected between the anode and cathode thereof through an anode voltage supply source, a cathode resistance for said tube connected between said cathode and said potential datum, a unilateral conduction device connected in shunt with at least a portion of said cathode resistance, a biasing arrangement for said unilateral conduction device whereby said conduction device is rendered conductive only for said discharge tube control electrode signal excursions in excess of a predetermined amplitude value to expand signal excursions in excess of said predetermined value with respect to signal excursions below said predetermined value, said output circuit resistance being so chosen as to form a time constant circuit with the inherent anode output capacity of said tube, for causing said amplifier to deliver a substantially non-uniform frequency response having low frequency accentuation but dropping off at a signal frequency of approximately 4 megacycles during the conduction of said conduction device while said cathode resistance is of such value as to markedly reduce the gain of said discharge tube amplifier when said conduction device is not conducting, and a capacitor connected in shunt with said cathode resistance, the time constant of said capacitor and said cathode resistance taken in conjunction with the mutual conductance of said tube being related such to render a substantially uniform frequency response of said amplifier up to said signal frequency at said markedly reduced gain, whereby low frequency components in the expanded portion of said signal are accentuated.

2. In a signal transmission channel for electrical signals having high and low amplitude portions as well as high and low frequency components, an electron discharge tube amplifier having at least an anode, cathode and control electrode, a potential datum, an input circuit for amplifying video signal to said discharge tube control electrode, an output circuit for said discharge tube consisting solely of a resistance connected between the anode and cathode thereof through an anode voltage supply, a cathode resistance for said tube connected between said cathode and said potential datum, a diode connected in shunt with said cathode resistance, a biasing arrangement for said diode whereby said diode is rendered conductive only for discharge tube control electrode signal excursions having a predetermined value to expand signal excursions in excess of said predetermined value with respect to signal excursions below said predetermined value, said output circuit resistance being so chosen as to form a time constant circuit with the inherent anode output capacity of said tube for causing said amplifier to deliver a substantially non-uniform frequency response having low frequency accentuation but dropping off at a signal frequency of approximately 4 megacycles during the conduction of said diode while said cathode resistance is of such value as to markedly reduce the gain of said discharge tube amplifier when said diode is not conducting, and a capacitor connected in shunt with said cathode resistance, the time constant of said capacitor and said cathode resistance taken in conjunction with the mutual conductance of said tube being related such to render a substantially uniform frequency response of said amplifier up to said signal frequency at said markedly reduced gain, whereby low frequency components in the expanded portion of said signal are accentuated.

3. Apparatus according to claim 2 wherein said diode has an anode and cathode, with its cathode connected with said discharge tube cathode and wherein said biasing arrangement is adjusted to render said diode non-conducting except for negative going input signals to said discharge tube control electrode negatively in excess of a given threshold amplitude relative to said potential datum.

4. Apparatus according to claim 2 wherein said cathode resistance, said capacitor and the mutual conductance of said discharge tube are further related such to render the gain of said amplifier at said signal frequency substantially the same either during conduction or non-conduction of said diode.

References Cited in the file of this patent

UNITED STATES PATENTS

| | | |
|---|---|---|
| 2,034,226 | Carter | Mar. 17, 1936 |
| 2,085,196 | Koch | June 29, 1937 |
| 2,091,134 | Beers | Aug. 24, 1937 |
| 2,222,933 | Blumlein | Nov. 26, 1940 |
| 2,224,699 | Rust | Dec. 10, 1940 |
| 2,261,335 | Braden | Nov. 4, 1941 |
| 2,261,803 | Grundmann | Nov. 4, 1941 |
| 2,289,821 | Boucke | July 14, 1942 |
| 2,320,558 | Boucke | June 1, 1943 |
| 2,378,999 | Gillespie | June 26, 1945 |
| 2,470,240 | Crosby | May 17, 1949 |
| 2,527,737 | Jordan | Oct. 31, 1950 |
| 2,547,648 | Loughren | Apr. 13, 1951 |
| 2,564,017 | Maggio | Aug. 14, 1951 |
| 2,583,345 | Schade | Jan. 22, 1952 |

FOREIGN PATENTS

| | | |
|---|---|---|
| 112,207 | Australia | Jan. 9, 1941 |
| 542,820 | Great Britain | Jan. 28, 1942 |
| 605,961 | Great Britain | Aug. 4, 1948 |
| 623,431 | Great Britain | May 17, 1949 |
| 845,897 | France | Sept. 4, 1939 |